UNITED STATES PATENT OFFICE.

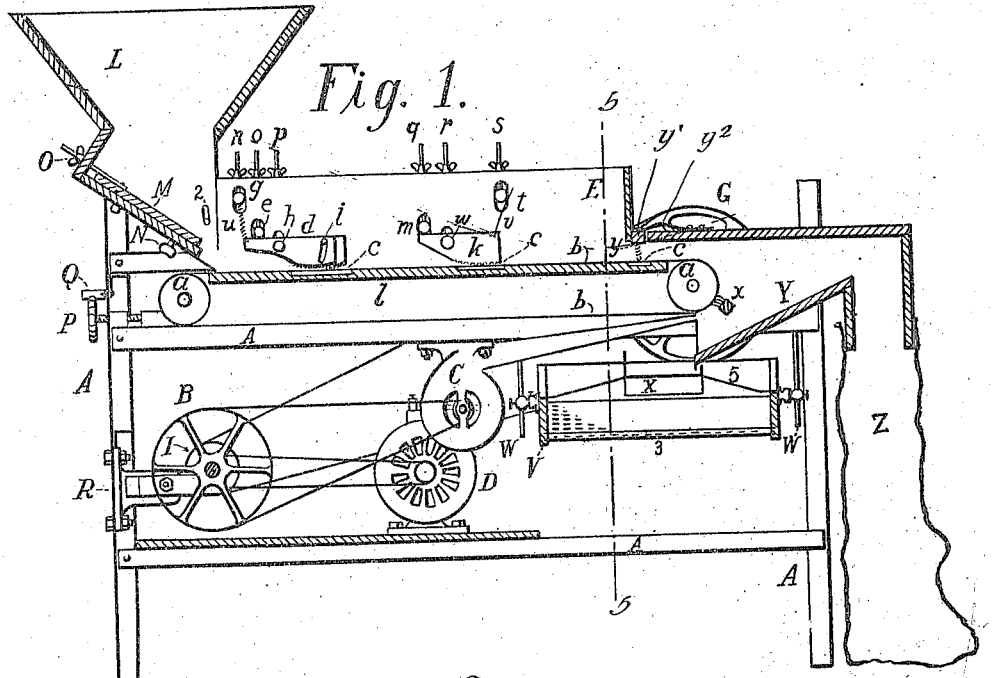
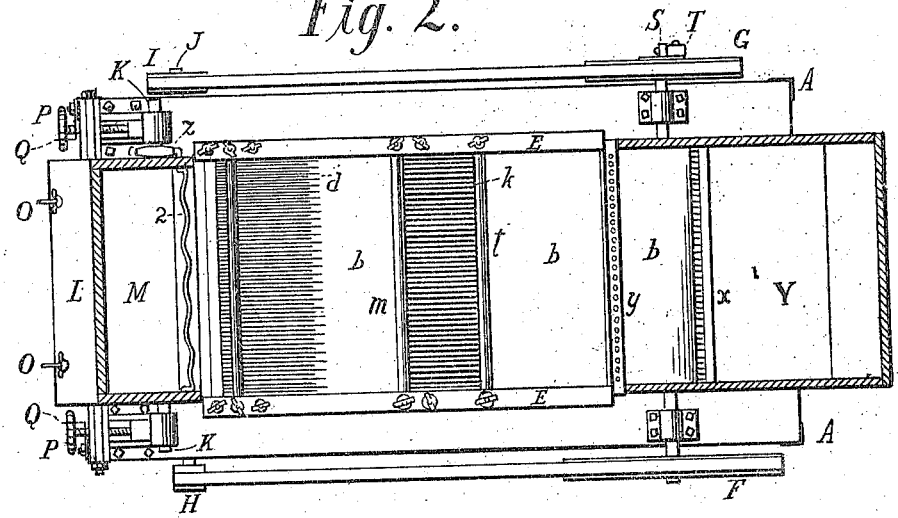

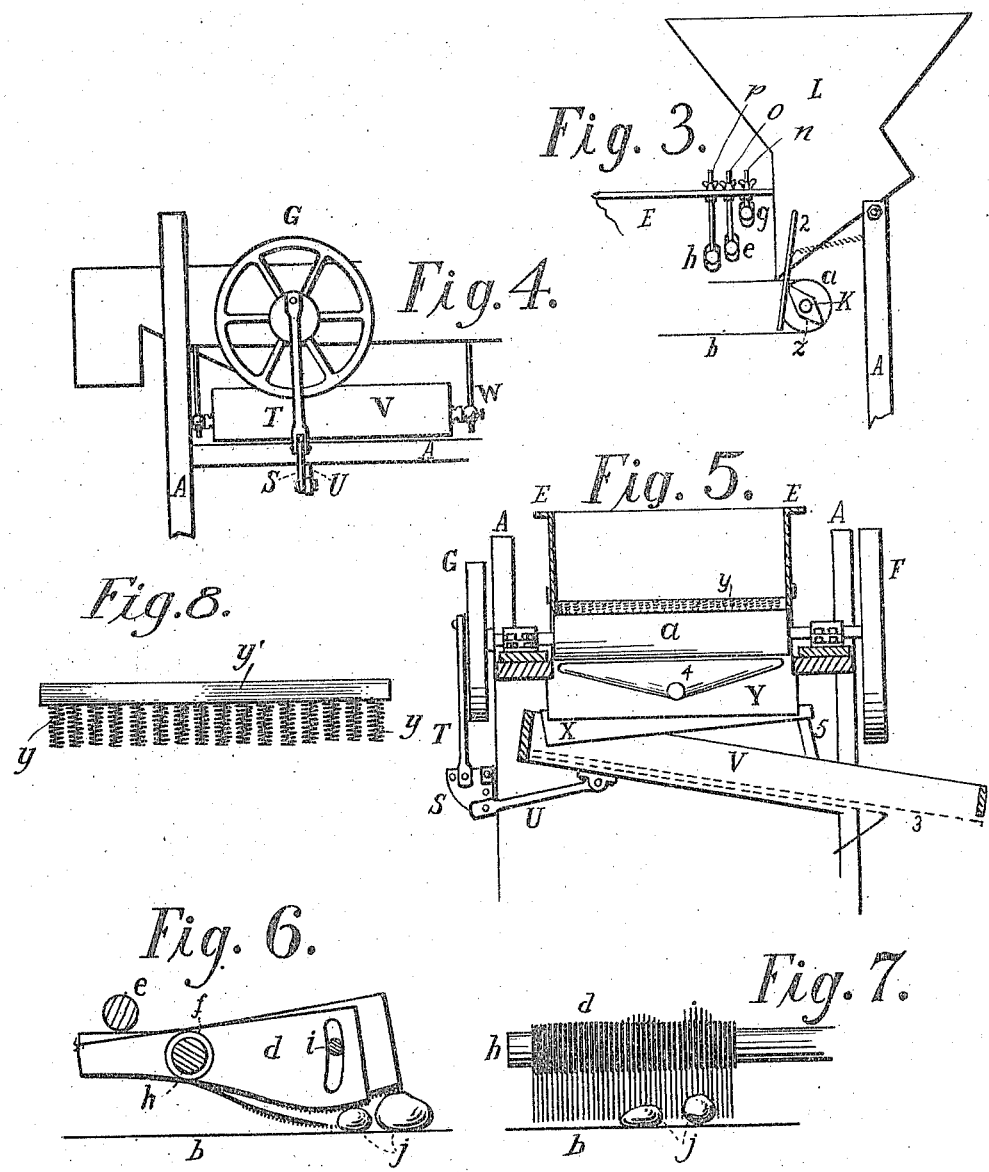

ANTON L. DELKIN, SR., OF SEATTLE, WASHINGTON.

NUT-BLANCHING MACHINE.

1,233,653. Specification of Letters Patent. Patented July 17, 1917.

Application filed April 26, 1915. Serial No. 24,132.

*To all whom it may concern:*

Be it known that I, ANTON L. DELKIN, Sr., a citizen of the United States, residing at Seattle, in the county of King and State of Washington, have invented a new and useful Nut-Blanching Machine, of which the following is a specification.

My invention relates to nut-blanching machines, and the object is to provide in a machine of this character, improved, simple and highly efficient means for removing skins and husks from nuts without injuring or breaking the nuts.

In the accompanying drawings, Figure 1 is a vertical sectional view. Fig. 2 is a top plan view, part of the upper frame-work of the machine being removed. Figs. 3 and 4 are fragmentary views in side elevation. Fig. 5 is a cross section on line 5—5, Fig. 1. Figs. 6 and 7 are details of the blanching knives. Fig. 8 is a detail showing the coil springs for removing the skins.

Unblanched nuts are poured into a bin or hopper L from which they are fed onto an endless conveyer $b$ supported by rollers $a$ at opposite ends of the machine. The discharge opening of the hopper L may be adjusted by means of a board M located on the inclined bottom of the hopper to regulate the flow of nuts therethrough and onto the conveyer. The board M may be moved up or down by means of a rod and screw O and when in its adjusted position may be made fast by a screw nut N.

2 designates a stirrer located in the discharge end of the hopper and which is in the form of a crimped rod, the ends being supported by the side walls of the hopper. This rod at one end has a downwardly extending arm which is designed to engage a cam $z$ on one end of a shaft $k$, the arm being held in engagement with the cam by a coil spring extending from the frame A to about the center of the rod, as shown in Fig. 3. The constant rotation of the cam will cause an oscillation of the stirrer which will agitate the nuts and make them flow evenly onto the conveyer. The conveyer is preferably made of rubber or other suitable material and its surface is corrugated or otherwise roughened to hold the nuts. As before stated, this conveyer is supported by rollers $a$ at opposite ends of the machines, one of the rollers being driven by a pulley G connected by a belt attached to a drive pulley I, which latter in turn receives its power from a motor D. The upper flight of the conveyer passes over a table $l$ which has spaced-apart transversely-arranged cut-outs $c$ on its upper face. The tension of the conveyer may be regulated by adjusting screws P secured to one of the rollers. These screws when properly adjusted may be made fast by a rod or lock Q, which fits in a slot in the handle of P.

The nuts are carried by the conveyer under a series of blanching knives $d$, which are preferably made of metal and are of such size and weight as to not crush or break the nuts, the under edges of the knives being serrated and sharpened so that engagement with the nuts will cause the skins to be cut. The series of cutting knives is arranged over one of the cut-outs $c$ in the table $l$. Some of these knives or cutters are of greater length than their companion knives, and I prefer to arrange them alternately, that is the long ones are interleaved by the short ones, as shown in Figs. 2 and 6, so that if a small nut follows a large one the short cutters or knives will drop and rake the small nut. The knives $d$ are pivoted on a shaft $h$ and each knife is a single operating unit in itself. The shaft $h$ is vertically adjustable in the side walls of the frame by means of screw-rods $p$ so that the knives may be positioned to act on various sized nuts. Each of the knives has an arcual slot which receives a guiding rod $i$, extending crosswise of the machine. A stop shaft $e$ extends from the sides of the frame over one end of the knives to regulate the drop of the latter toward the conveyer. This rod may be raised and lowered by means of screw rods $o$. Each of the knives is held in working position by a coiled spring $u$ one end of which is attached to the knife and the other to an adjustable cross rod $g$, the vertical position of which is regulated by screw rods $n$.

$k$ designates a series of rubbing fingers which are spaced apart from but in the same plane with the knives $d$. These fingers are preferably formed of rubber, leather or other suitable material and are pivotally mounted on a cross rod $w$ supported by the side walls of the frame and adjustable by means of screw rods $r$ for various sizes of nuts. Movement of the fingers on the rod $w$ is limited in one direction by an adjustable cross rod $m$, screw rods $q$ regulating the position thereof. The fingers are held toward the conveyer by means of springs $v$ the tension of each of which is regulated by a bar $t$ supported by the sides of the frame and adjustable therein by means of screw-rods $s$. The under edges of the fingers are roughened so as to effectively separate the skins from the nuts as they pass thereunder. The fingers $k$ are located over the second of the series of cut-outs $c$ in the table $l$.

After passing under the rubbing fingers the nuts are carried by the conveyer under a set of vertically arranged coil springs $y$ extending transversely across the machine. These springs are secured to a cross member $y'$ supported by spring arms $y^2$, Fig. 1, and are designed to remove any portions of the skins still adhering to the nuts. The springs may or may not be covered with rubber.

The location of cut-outs $c$ in the board $l$, under the knives $d$, the rubbing fingers $k$ and the springs $y$, renders the belt carrying the nuts flexible at these points thereby preventing the nuts being injured by the action of the various members. After passing the springs $y$, the nuts are carried by the conveyer to an inclined table Y, any portions of the skins sticking to the conveyer being removed therefrom by a brush $x$. The nuts fall off the inclined table Y into a trough X which latter is suspended beneath the table and held in position by a frame 5.

The skins are separated from the nuts by a blower C which blows them from the high end of the inclined table Y and into a sack Z hung from the frame of the machine. The blower may be operated in known manner, as by a belt driven by a pulley B which in turn is connected by belt to the motor D.

From the trough X the nuts pass onto an inclined screen or grader 3 which is supported by a jogger frame V. This grader is perforated so that the broken or extremely small nuts will fall through into a receptacle below, the whole nuts passing over the screen or grader into any preferred receptacle. Motion is imparted to the frame V by belt operated pulley G which is connected with the frame by a crank T, a rocker arm S and a rod U.

It will be seen that I have produced a very simple machine for the blanching of nuts. The parts are so arranged that the skins of the nuts are first cut, the nuts then passing under rubbers which remove the skins, and that thereafter any portions of the skins remaining on the nuts are freed by a series of coiled springs. Simple means are also provided for adjusting the cutting and rubbing members to accommodate nuts of various sizes.

I claim as my invention:

1. A nut blanching machine comprising, in combination, a hopper, a conveyer in operative relation thereto, a series of blade-like cutting members in coöperative relation with said conveyer, said members being designed to engage said nuts in variable horizontal planes, and a series of rubbers in the path of nuts fed by said conveyer.

2. A nut blanching machine comprising, in combination, a hopper, a conveyer in operative relation thereto, a series of blade-like cutting members arranged transversely of said conveyer above the upper flight thereof, said members being designed to be moved to conform to the contour of the portions of the nuts in engagement therewith, a series of rubbers extending across said conveyer, and a series of strippers in coöperative relation with said conveyer.

3. A nut blanching machine comprising, in combination, a hopper, an endless conveyer, a series of alternately short and long cutting members arranged transversely of said conveyer above the upper flight thereof, a series of rubbers spaced from said cutting members, and a series of strippers spaced from said rubbers.

4. A nut blanching machine comprising, in combination, a hopper, an endless conveyer having a roughened surface, a supporting table for the upper flight of said conveyer, said table having a series of transverse recesses, a series of knives above said conveyer in line with one of said recesses, a series of rubbers above said conveyer in line with another of said recesses, and a series of strippers located above said conveyer and in line with a third of said recesses.

5. A nut blanching machine comprising, in combination, a hopper, an endless conveyer having a roughened surface, a series of blade-like cutting members pivotally supported in juxtaposition to said conveyer, a series of pivoted rubbers spaced from but in approximately the same horizontal plane with said cutting members, and a series of strippers.

6. A nut blanching machine comprising, in combination, a hopper, a conveyer in operative relation thereto, a series of adjustably supported cutting blades above said conveyer, each of said blades being independently movable to conform to the contour of the portions of the nuts in engagement therewith, and a series of pivotally supported rubbing members spaced from said cutting blades and in coöperative relation with said conveyer.

ANTON L. DELKIN, Sr.

Witnesses:
 Ewing D. Colvin,
 Glenn C. Beechler.